United States Patent

Perry, Jr.

[15] 3,668,534

[45] June 6, 1972

[54] J-K FLIP-FLOP MONOSTABLE MULTIVIBRATOR APPARATUS

[72] Inventor: James R. Perry, Jr., Cedar Rapids, Iowa
[73] Assignee: Collins Radio Company, Dallas, Tex.
[22] Filed: Mar. 5, 1971
[21] Appl. No.: 121,426

[52] U.S. Cl..............................328/207, 307/273, 307/276, 328/206
[51] Int. Cl. .........................................................H03k 3/10
[58] Field of Search..................307/273, 289, 291, 292, 276; 328/206, 207

[56] References Cited

UNITED STATES PATENTS

| | | |
|---|---|---|
| 3,541,356 | 11/1970 | Lagemann..........................307/291 X |
| 3,560,766 | 2/1971 | Moore....................................307/291 |
| 2,943,212 | 6/1960 | Hill et al. ............................307/273 X |
| 2,963,593 | 12/1960 | Suran et al. .........................307/273 X |
| 3,294,983 | 12/1966 | Draper, Jr............................307/273 X |
| 3,497,725 | 2/1970 | Lorditch, Jr. ...........................307/273 |
| 3,532,993 | 10/1970 | Kennedy..............................307/283 X |

Primary Examiner—Stanley D. Miller, Jr.
Attorney—Robert J. Crawford and Bruce C. Lutz

[57] ABSTRACT

The circuit and method of connecting a J-K flip-flop so that it will operate as a one-shot multivibrator comprising establishing a "set" input at a logic 0 and an appropriate J or K input at a logic 1 for momentary operation in response to a clock input.

8 Claims, 3 Drawing Figures

INVENTOR
JAMES R. PERRY, JR.
BY Bruce C Lutz
ATTORNEY

J-K FLIP-FLOP MONOSTABLE MULTIVIBRATOR APPARATUS

THE INVENTION

The present invention is related generally to electronic circuits and more specifically to monostable multivibrator apparatus. Even more specifically, the present invention comprises a method of reconnecting a J-K flip-flop so that it may be used as a one-shot multivibrator.

In the prior art, one-shot or monostable multivibrators were designed as such because discrete components were available for implementing same. Many examples are found in the prior art literature on various types of one-shot multivibrators.

In the present stage of the art, J-K flip-flops (f/f) are produced as a single integrated circuit and are often more economically available than other types of circuits which could be used for one-shot multivibrators. The present invention utilizes this availability of a J-K flip-flop by reconnecting said flip-flop to perform a one-shot multivibrator function.

It is therefore an object of the present invention to provide a novel one-shot multivibrator circuit.

Other objects and advantages of the present invention may be ascertained from a reading of the specification and appended claims in conjunction with the drawings wherein the three figures illustrate various embodiments of connecting a J-K flip-flop in the manner taught by the present invention.

Figure 1:
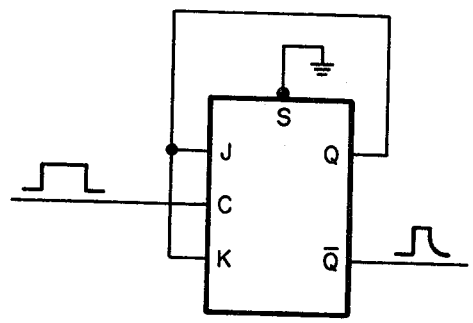

Referring now to the drawings, it will be noted that each of the figures is connected slightly differently. The terminal designations shown are standard in the J-K f/f industry. In FIG. 1 the Q or true output is connected to the J and K inputs while the S input is connected to ground and the C input is connected to a clock source. In this connection the output will be obtained from the $\overline{Q}$ or false output when the input clock signal drops from the positive value to a negative value. This of course assumes the use of a negative edge (toward ground) trigger J-K flip-flop. If a positive edge trigger J-K flip-flop were used the circuit drawings would still be the same although the output signal would appear at the leading edge of the clock input.

An example of a J-K flip-flop, which may be used to practice the present invention, is an SF200 series as supplied by Sylvania Electric Products, Inc. This f/f contains a charge storage method of clocking which method assists in practicing the invention.

The grounding of the set input keeps the Q output at a logic one level at all times. This supplies the necessary logic one input to the K terminal. If the K terminal is not connected to a logic one input, the flip-flop will not attempt to change states. The grounding of the S terminal, however, keeps the Q terminal at a constant logic one. The application of the clock signal to the C input with a logic one applied to the K input will produce an attempt by the J-K flip-flop to change its state. The grounding of the S terminal, however, will prevent the change. Although the voltage level at the Q terminal remains constant, the output at the $\overline{Q}$ terminal will rise and then will immediately thereafter drop back to zero as shown.

While it will be observed that the J terminal is connected in all embodiments shown, it is not necessary to connect the J terminal to anything. However, it is good design practice to connect the J input to either a logic one or a zero rather than letting it remain open circuited.

Figure 2:
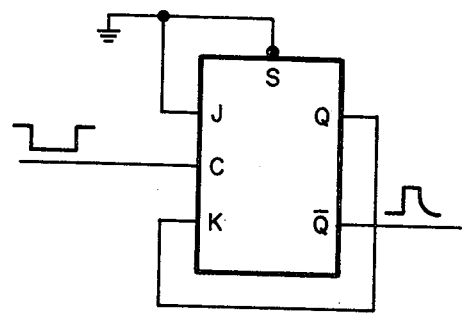

Referring now to FIG. 2, it will be noted that in accordance with the above stated philosophy the J input is now connected to a logic zero or ground. Further, a negative going toward ground clock is supplied to the C terminal so that the output is obtained on the leading rather than the trailing edge as shown in FIG. 1.

Figure 3:
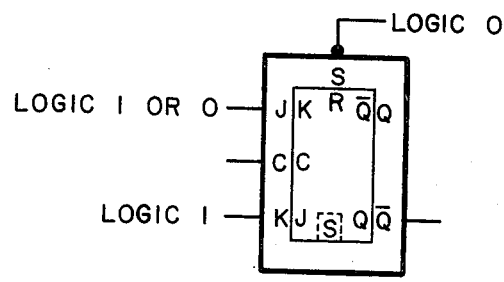

In FIG. 3 it is disclosed that the only connections required are the application of a logic zero to the S terminal, a logic one to the K terminal and a pulse to the C terminal. The pulse can be either negative-going or positive-going, depending upon the construction of the J-K flip-flop. The output may, of course, either be negative-going or positive-going in accordance with the construction of the flip-flop. If the $\overline{Q}$ output were negative-going, the other circuit parameters of the flip-flop would also probably be changed and the S and K input logic values may have to be reversed.

FIG. 3 contains an inner block wherein the J and K inputs are interchanged as well as the Q and $\overline{Q}$ outputs. Further, the R input is interchanged with the S input. This disclosure is presented since some flip-flops only have R inputs while some have only S inputs and still others contain both S and R inputs. The variety of combinations available require slightly different connections. The S input in the inner block of FIG. 3 is shown in dash lines to illustrate that it may or may not appear in combination with the reset input. If it does appear, however, it would be connected to a logic one while the R input is connected to a logic zero. This type of flip-flop would, as shown, provide the pulse from the Q output instead of the $\overline{Q}$; and the K input could either be grounded or have a logic one, while the J input would be provided with a logic one.

It should further be noted that each of the inputs for the set or reset contain a small circular notation. This is intended to refer to an inverting input. However, all J-K flip-flops which will operate according to the teachings of the present invention do not contain an inverting feature and compensations in logic levels must be taken into account in practicing the invention.

In view of the wide variety of types of flip-flops which may be used in practicing the invention, I intend, in the attached claims, to have the word "set" cover not only the set input but also the input referred to as "reset" or "preset". Further, since there are obviously embodiments of the invention other than the few illustrative embodiments shown in the figures, I am restricting my invention only to the concept of maintaining the "set" input of a J-K flip-flop at a value such that one of the outputs will attempt to change in potential upon application of a clock pulse but is prevented from permanently doing so by the logic value supplied to this "set" input.

I claim:

1. Apparatus of the class described comprising in combination:
   J-K flip-flop means including set, clock and K inputs and a false output;
   means for continuously supplying a logic zero connected to said set input;
   means for continuously supplying a logic one connected to said K input;
   means for supplying a clock signal connected to said clock input; and
   output means connected to said false output for receiving therefrom a pulse for each clock signal applied to said clock signal input.

2. Apparatus as claimed in claim 1 wherein said J-K flip-flop includes a true output connected for supplying said logic one to said K input.

3. Apparatus as claimed in claim 1 wherein said J input is connected to said set input and the means for supplying a logic zero is ground.

4. The method of converting a J-K flip-flop to a one-shot multivibrator comprising the steps of:
   grounding the set input;
   connecting a logic one to the K input; and
   supplying a clock signal to the clock input of the J-K flip-flop whereby a short duration pulse is obtained from the false output thereof.

5. One-shot multivibrator apparatus comprising, in combination:
   J-K flip-flop means including J, K, C, and S inputs, and Q and $\overline{Q}$ outputs;
   means connecting said Q, J, and K terminals together;
   means connecting said S terminal means to a logic zero; and
   means for supplying a clock input to said C terminal means whereby a single output pulse is obtained from the $\overline{Q}$ output upon each application of a clock signal to said C terminal means.

6. One-shot multivibrator means comprising, in combination:

J-K flip-flop means including S and J terminal means connected to a logic zero signal source, a Q terminal means connected to a K input and further including C and $\bar{Q}$ terminal means;

means for supplying a negative-going clock signal to said C terminal means; and output means for supplying a short duration output signal from said Q terminal means upon each negative-going occurrence of said clock signal to said C terminal means.

7. One-shot multivibrator apparatus comprising, in combination:

J-K flip-flop means including "set" J, K, clock, and at least one output terminal means;

means for continuously supplying a logic one to one of said J and K terminal means;

means for continuously supplying a logic zero to said "set" input means; and means for supplying a clock input signal to said clock input means whereby said at least one output terminal means momentarily attempts to change in potential but is prevented from doing so by the logic value supplied to said "set" input.

8. The method of converting a J-K flip-flop comprising J and K input means, "set" terminal means, output means, and clock means to a one-shot multivibrator comprising the steps of:

continuously supplying a first logic signal to the set means to prevent permanent change of potential at said output means;

continuously supplying a second logic signal to one of said J and K inputs; and supplying a clock signal to the clock input of the J-K flip-flop whereby a short duration pulse is obtained from said output means thereof.

* * * * *